July 26, 1966
J. S. MORZ ETAL
3,262,404
COOKIE PRESS
Filed May 29, 1964
2 Sheets-Sheet 1
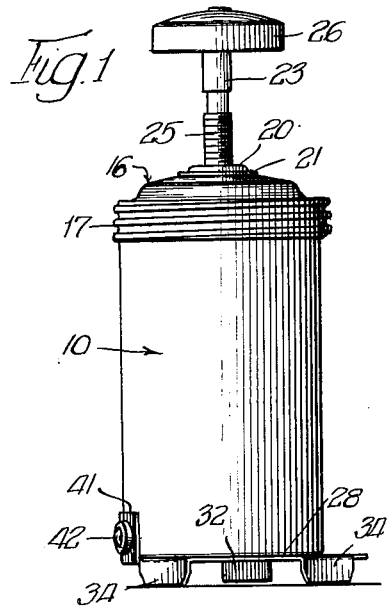
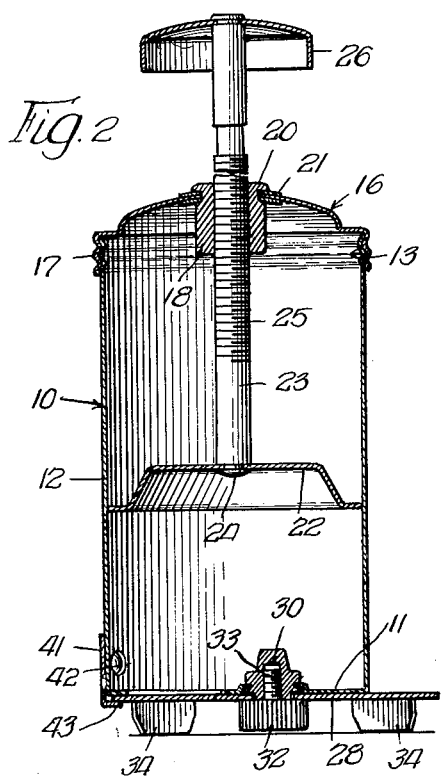
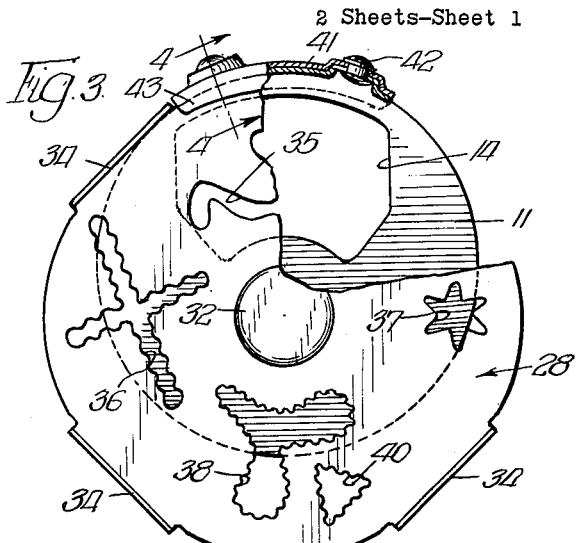
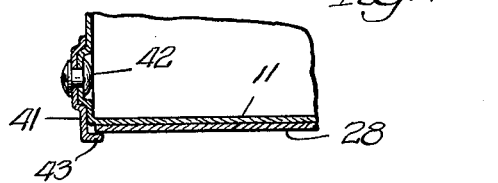
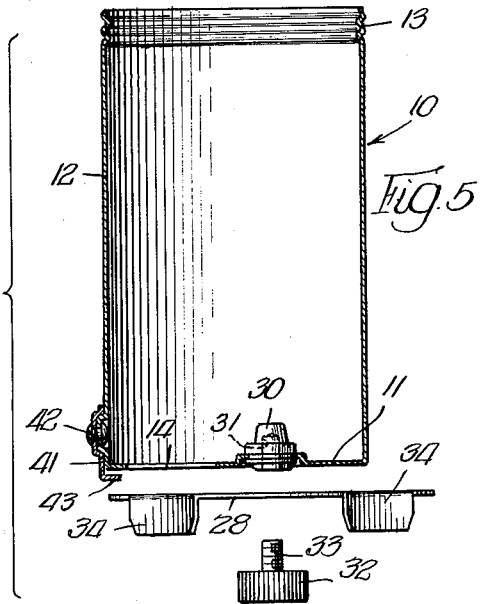
INVENTORS.
James S. Morz,
BY John W. Wiesner July 26, 1966   J. S. MORZ ETAL   3,262,404
COOKIE PRESS Filed May 29, 1964   2 Sheets-Sheet 2

INVENTORS.
James S. Morz,
BY John W. Wiestler,
Hume Groen Clement & Hume
attys.

… … …

United States Patent Office 3,262,404
Patented July 26, 1966

3,262,404
COOKIE PRESS
James S. Morz and John W. Wiesner, both of Manitowoc, Wis., assignors to Mirro Aluminum Company, Manitowoc, Wis., a corporation of New Jersey
Filed May 29, 1964, Ser. No. 371,212
7 Claims. (Cl. 107—52)

The invention relates to a press for extruding doughlike material to form cookies to be baked and has reference in particular to a cookie press having an adjustable forming plate with openings of different shape through which the dough-like material is extruded.

The cookie press of the invention essentially consists of a body portion in the form of a cylinder having a piston, a threaded piston rod and an exterior handle. By actuation of the handle the piston can be propelled downwardly to force the cookie dough or batter within the cylinder and below the piston through one or more openings in a die or forming plate, thus producing cookies of a characteristic shape.

An object of the invention is to provide a cookie press as described and wherein the apertured forming plate or die is rotatably mounted on the bottom wall of the cylinder so that an opening of a different shape can be rendered operative by rotative adjustment of the forming plate.

A further object resides in the provision of a cookie press having an apertured forming plate rotatably mounted on the bottom wall of the cylindrical body portion thereof and which is so formed as to provide a plurality of angularly spaced foot portions for supporting the cookie press in an upright position and with the forming plate spaced from the supporting surface.

An additional object of the invention is to provide a cookie press incorporating the apertured forming plate as described and wherein the plate has the foot portions formed integrally therewith.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is an elevational view showing a cookie press embodying the improvements of the invention;

FIGURE 2 is a vertical sectional view on a somewhat larger scale substantially through the center of the cookie press as shown in FIGURE 1;

FIGURE 3 is a bottom plan view of the present cookie press with certain operative parts being shown in section;

FIGURE 4 is a sectional detail view taken substantially on line 4—4 of FIGURE 3;

FIGURE 5 is an exploded view of the several parts of the present cookie press with the cylinder being shown in section;

Figure 6:
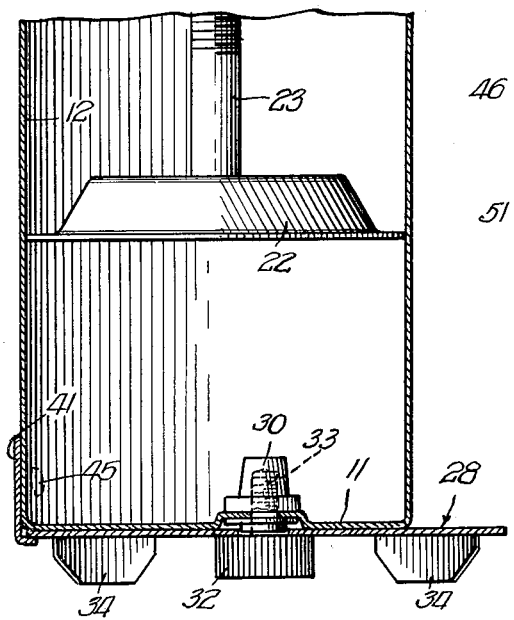
FIGURE 6 is a fragmentary sectional view illustrating a modification wherein the bracket is welded to the cylinder wall of the body portion.

The embodiment selected for illustrating the cookie press of the invention consists of a body portion 10 in the form of a cylinder having an open top end and a bottom wall 11. The arcuate side walls 12 of the body portion 10 are corrugated adjacent the open top end in a manner to form threads 13. The bottom wall 11 is apertured to provide a fairly large opening 14 located to one side of the center of the bottom wall and having a slight arcuate curvature with the center as the axis. The open top end of the cylinder is closed by a releasable cover 16, the peripheral rim of which includes the threads 17 having the same pitch as the threads 13, and by means of which the cover is releasably held on the cylindrical body portion. A metal nut 18 is located centrally of the cover 16, the nut having an internally threaded bore and which is peaned over at 20 so as to fasten the nut to the cover, with a washer 21 being located exterioly and internally of the cover.

A piston 22 is located within the cylinder 10 and a threaded piston rod 23 is fixed at 24 to the piston 22. The threaded central portion 25 of the piston rod 23 extends through the nut 18, being threaded thereto, and the projecting exterior end of the piston rod has the handle 26 fixed to the same.

A forming plate identified by numeral 28 is releasably secured to the bottom wall 11 by the anchoring bolt 30 which is fixedly secured to an indented portion of the bottom wall. It will be observed that the anchoring bolt 30 is located eccentrically of the bottom wall 11 and is provided with a threaded bore 31 having an entrance opening in the bottom face of the bolt. Thus the bolt 30 serves as an anchoring member for releasably securing the apertured plate 28 on the bottom wall of the cylinder 10 and in the desired rotative position with respect to the opening 14. This is accomplished by the member 32 having the threaded stem 33 and which is adapted to extend through a center opening in the form plate and into the bore 31 so as to have threaded relation therewith. The forming plate is provided with a plurality of foot portions 34, four being preferred, and which are bent downwardly as an integral part of the plate. Also, the said forming plate in accordance with the invention has a plurality of openings formed therein of special shape, such as the opening 35 of irregular shape, the opening 36 in the general shape of a cross, the opening 37 in the shape of a star, and openings 38 and 40 of general triangular shape.

The bracket 41 fixed to the body portion 10 by the rivets 42 functions as an indexing element for the forming plate 28. The bracket provides a depending flange 43, FIGURE 4, which receives the peripheral edge of the forming plate when the plate is in secured relation on the bottom wall 11. The length of the bracket is such that a pair of the feet or foot portions 34 will be disposed on respective sides of the bracket and thus the bracket 41 will hold the plate in each of four indexed positions. For example, the particular indexed position as shown in FIGURE 3 locates the irregular shaped opening 35 in alignment with opening 14.

In order to index the plate so as to locate a different shaped opening in alignment with 14, the member 32 is turned by the operator to loosen the forming plate and disengage the plate from the boss on the nut 30. When thus loosened the plate can be slid to one side sufficient to disengage it from the bracket 41. The forming plate is then turned approximately ninety degrees and the plate is again secured in place on wall 11 by effecting a threaded relation of the member 32 with the bolt 30. However, in this new indexed position the opening 36, for example, may be aligned with the enlarged opening 14 and as previously described the plate 28 will be retained by the feet 34, a pair of which will have location on respective sides of the bracket 41.

In operation of the cookie press as described the batter or dough-like material is placed within the cylinder 10 and the piston or plunger 22 is inserted and retained in place by the cover 16 which is threaded to the cylinder. It will be assumed that the forming plate 28 has been properly indexed for aligning the desired opening either 35, 36, 37, 38 or 40 with the enlarged opening 14. Upon turning of the handle 26 by the operator, the plunger 22 can be gradually caused to move downwardly within the cylinder 10 to compress the batter or dough-like material and to cause the same to be extruded through one of the openings such as 35 formed in the plate. Thus a cookie of the desired shape is produced and the operation can be conveniently performed with the cookie press in an upright position, being supported on a pan or the like by the foot portions 34.

Figure 7:
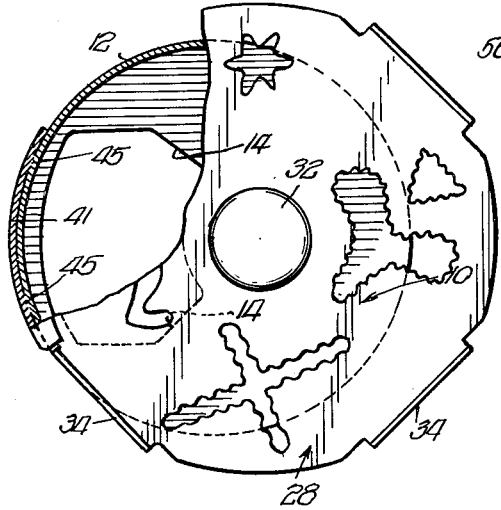
FIGURE 7 is a bottom plan view of FIGURE 6 with parts in section to show the spot welding of the bracket.

In the modification of FIGURES 6 and 7 the bracket 41 is fixed to the cylindrical wall of the body portion 12 by spot welding at points designated by the numerals 45. The welding eliminates the need for the rivets as employed in the device shown in FIGURE 1 and the exterior appearance of the cookie press is accordingly enhanced.

Figure 8:
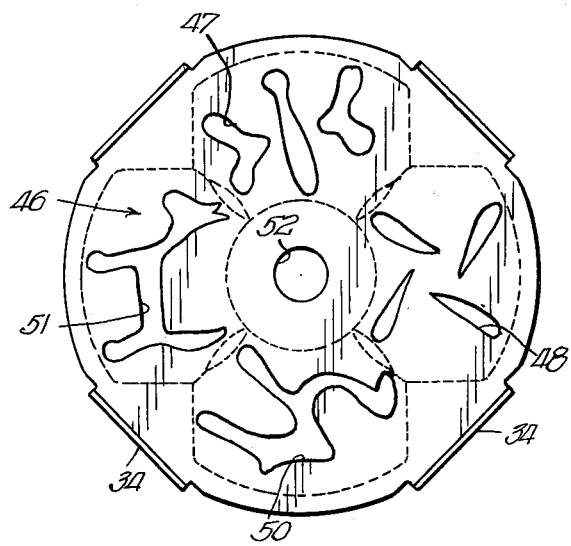
FIGURES 8 and 9 are plan views of forming plates showing the same provided with openings of a characteristic shape, but different from the openings in the plate shown in FIGURE 3.
Figure 9:
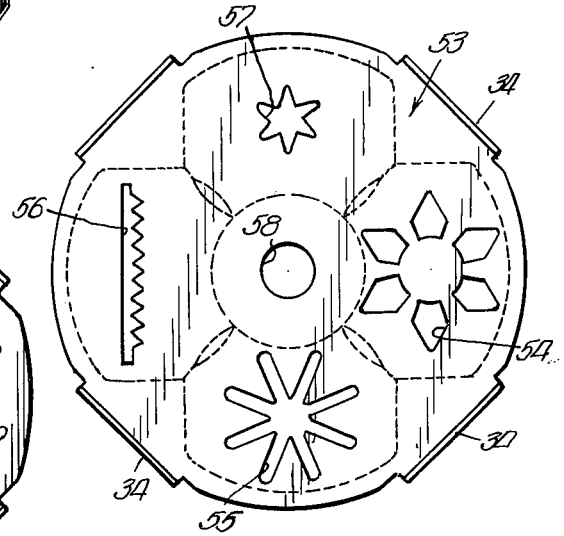

FIGURES 8 and 9 show forming plates which have openings therein of special shape and which differ from the characteristically shaped openings provided in plate 28 of FIGURE 3. Plate 46 of FIGURE 8 has a plurality of irregularly shaped openings 47, 48, 50 and 51 and which are so disposed as to occupy a particular quadrant of the plate. Thus the group openings 47 and 48, and also the single openings 50 and 51 are located within the area of the large opening 14 formed in the bottom wall of the cylinder 10. The center opening 52 in the plate 46 is adapted to receive the securing member 32.

The plate 53 of FIGURE 9 is similar to plates 28 and 46 except that openings of different shape are formed in the plate. The group opening is designated by numeral 54 and the single openings by numerals 55, 56 and 57. The center opening 58 is for receiving the securing member 32 which when threaded in the nut 30 and tightened will secure the forming plate to the bottom wall of the cylinder all in a manner as described with respect to FIGURE 1. The integral foot portions 34 on each of the plates 46 and 53 perform the dual function of indexing the plate in the same manner as for plate 28. When a plate is indexed a pair of foot portions are disposed and in contact with respective sides of the fixed bracket 41.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In a cookie press of the character described, in combination, a body portion in the form of a cylinder having a bottom wall and an open top end, said bottom wall having an opening therein located to one side of the center of the said wall, a cover for the open top end of the cylinder and which has a releasable connection therewith, a plunger located within the cylinder, means operatively connecting the plunger with the cover whereby actuation of said means will cause movement of the plunger axially of the cylinder, an apertured forming plate rotatably carried by the bottom wall exteriorly thereof, and said forming plate having a size to underlie the opening in the bottom wall, whereby the aperture in said forming plate may be aligned with the said opening by rotative adjustment of the said plate.

2. A cookie press of the character as defined by claim 1, wherein the forming plate is rotatably carried by the bottom wall at a location eccentrically of the bottom wall, and wherein said forming plate has a plurality of apertures therein angularly spaced with respect to the axis of rotation of the plate.

3. A cookie press of the character as defined by claim 1, wherein the forming plate is circular and larger in diameter than the bottom wall, wherein said plate is rotatably carried by the bottom wall at a location eccentrically of the bottom wall, and wherein said forming plate has a plurality of apertures therein angularly spaced with respect to the axis of rotation of the plate.

4. In a cookie press of the character described, in combination, a body portion in the form of a cylinder having a bottom wall and an open top end, said bottom wall having an opening therein of relatively large size and which is located to one side of the center of the said wall, a cover for the open top end of the cylinder and which has a releasable connection therewith, a plunger located within the cylinder, a piston rod threadedly connecting the plunger with the cover whereby rotation of the piston rod will cause movement of the plunger axially of cylinder, a forming plate rotatably carried by the bottom wall exteriorly thereof, said forming plate having a size greater in area than the bottom wall and being rotatably carried by the bottom wall at a location eccentrically of the said wall, whereby the forming plate will underlie the large size opening in the bottom wall, and said forming plate having a plurality of apertures therein of characteristic shape and which are angularly spaced and smaller in size than the said opening.

5. A cookie press of the character described in claim 4, wherein the forming plate is circular in outline and has a diameter greater than the diameter of the bottom wall, and wherein the apertures of characteristic shape are angularly spaced approximately ninety degrees.

6. A cookie press of the character described in claim 4, additionally including a bracket fixed to the side wall of the cylinder adjacent the bottom wall, and foot portions provided by the forming plate and projecting therefrom in a direction away from the bottom wall, said foot portions and the bracket coacting in a manner to maintain the forming plate in certain desired rotative positions.

7. In a cookie press of the character described, in combination, a body portion in the form of a cylinder having a bottom wall and an open top end, said bottom wall having an opening therein of relatively large size and which is located to one side of the center of the said wall, a cover for the open top end of the cylinder and which has a releasable connection therewith, a plunger located within the cylinder, a piston rod having a fixed connection with the plunger and having a threaded connection with the cover whereby rotation of the piston rod will cause movement of the plunger axially of the cylinder, a forming plate rotatably carried by the bottom wall exteriorly thereof, said forming plate being releasable from the bottom wall and having a diameter greater than that of the bottom wall, whereby the forming plate will underlie the large size opening in the bottom wall, a plurality of foot portions integral with the forming plate and spaced ninety degrees around the periphery thereof, said forming plate having a plurality of apertures therein of characteristic shape and which are smaller in size than the said opening and angularly spaced approximately ninety degrees, and a bracket fixed to the side wall of the cylinder adjacent the bottom wall, said bracket and foot portions co-acting in a manner to maintain the forming plate in certain desired rotative positions.

References Cited by the Examiner

UNITED STATES PATENTS

| 2,055,868 | 9/1936 | Larsen | 107—52 |
| 2,634,692 | 4/1953 | Sherbondy | 107—52 |
| 2,927,543 | 3/1960 | Sherbondy | 107—52 |

FOREIGN PATENTS 332,141  11/1935  Italy.

WILLIAM I. PRICE, *Primary Examiner.*